(12) United States Patent
Liu et al.

(10) Patent No.: US 11,722,407 B2
(45) Date of Patent: Aug. 8, 2023

(54) PACKET PROCESSING METHOD AND APPARATUS

(71) Applicant: Huawei Technologies Co., Ltd., Shenzhen (CN)

(72) Inventors: Bingyang Liu, Beijing (CN); Sipei Lv, Beijing (CN); Rui Meng, Beijing (CN); Fei Yang, Beijing (CN); Chuang Wang, Beijing (CN); Li Qiang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 275 days.

(21) Appl. No.: 17/104,700

(22) Filed: Nov. 25, 2020

(65) Prior Publication Data
US 2021/0083970 A1 Mar. 18, 2021

Related U.S. Application Data

(63) Continuation of application No. PCT/CN2019/088700, filed on May 28, 2019.

(30) Foreign Application Priority Data

May 28, 2018 (CN) .......................... 201810524838.9

(51) Int. Cl.
*H04L 45/50* (2022.01)
*H04L 45/02* (2022.01)
(Continued)

(52) U.S. Cl.
CPC .............. *H04L 45/50* (2013.01); *H04L 45/02* (2013.01); *H04L 45/34* (2013.01); *H04L 47/22* (2013.01); *H04L 69/22* (2013.01)

(58) Field of Classification Search
CPC ......... H04L 45/02; H04L 45/34; H04L 45/50; H04L 47/22; H04L 69/22
See application file for complete search history.

(56) References Cited

U.S. PATENT DOCUMENTS 9,686,194 B2 * 6/2017 Jacobson ................ H04L 45/12
10,873,533 B1 * 12/2020 Ismailsheriff ........... H04L 47/12
(Continued)

FOREIGN PATENT DOCUMENTS

CN 101237386 A 8/2008
CN 101931884 A 12/2010
(Continued)

OTHER PUBLICATIONS

IEEE Standards Association, IEEE Standard for Local and metropolitan area networks-Bridges and Bridged Networks-Amendment 29: Cyclic Queuing and Forwarding, IEEE Computer Society, IEEE Std 802.1Qch™-2017, Approved May 18, 2017, 30 pages.

*Primary Examiner* — Melanie Jagannathan
(74) *Attorney, Agent, or Firm* — Huawei Technologies Co., Ltd.

(57) ABSTRACT

Embodiments of the present invention provide a packet processing method, which is applied to a first node. The method includes: obtaining N first packets, where N is an integer greater than or equal to 1, and each of the first packets includes a first label; and sending the N first packets in a sending period corresponding to the first label.

20 Claims, 5 Drawing Sheets

(51) Int. Cl.
  *H04L 45/00* (2022.01)
  *H04L 47/22* (2022.01)
  *H04L 69/22* (2022.01)

(56) References Cited

U.S. PATENT DOCUMENTS

| | | | | |
|---|---|---|---|---|
| 2009/0073977 | A1* | 3/2009 | Hussain | H04L 49/70 |
| | | | | 370/389 |
| 2009/0310614 | A1* | 12/2009 | Krishnamurthy | H04L 47/825 |
| | | | | 370/401 |
| 2010/0202303 | A1* | 8/2010 | Gu | G01S 11/02 |
| | | | | 370/252 |
| 2014/0310427 | A1* | 10/2014 | Shaw | H04L 61/5007 |
| | | | | 709/244 |
| 2015/0181459 | A1* | 6/2015 | Zhu | H04W 28/16 |
| | | | | 370/236 |
| 2016/0164792 | A1* | 6/2016 | Oran | H04L 43/0852 |
| | | | | 370/236 |
| 2016/0226758 | A1* | 8/2016 | Ashwood-Smith | |
| | | | | H04L 41/342 |
| 2016/0352732 | A1* | 12/2016 | Bamasag | H04W 4/70 |
| 2018/0103128 | A1* | 4/2018 | Muscariello | H04L 45/306 |
| 2018/0241679 | A1* | 8/2018 | Muscariello | H04L 45/121 |
| 2018/0367452 | A1* | 12/2018 | Amin | H04L 61/50 |
| 2019/0158370 | A1* | 5/2019 | You | H04W 4/70 |
| 2020/0059436 | A1* | 2/2020 | Chen | H04L 67/60 |

FOREIGN PATENT DOCUMENTS

| | | |
|---|---|---|
| CN | 102014431 A | 4/2011 |
| CN | 102904775 A | 1/2013 |
| CN | 104917641 A | 9/2015 |
| CN | 105281969 A | 1/2016 |
| CN | 103929263 B | 10/2016 |
| WO | 2010151003 A2 | 12/2010 |
| WO | 2016049872 A1 | 4/2016 |
| WO | 2016128931 A1 | 8/2016 |

* cited by examiner

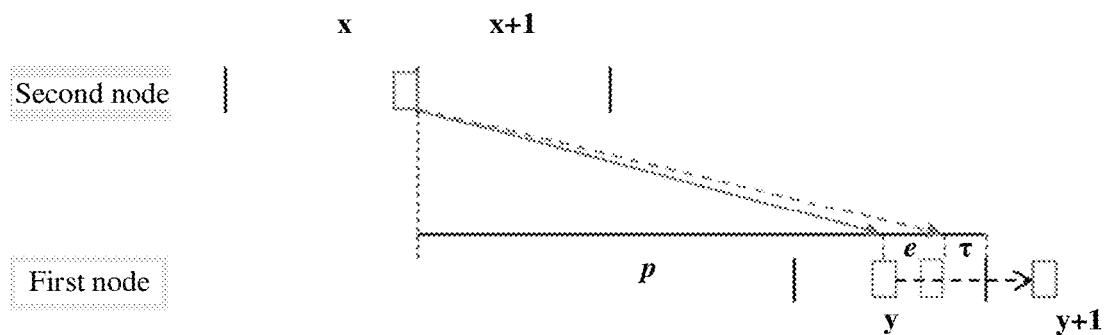
FIG. 3A
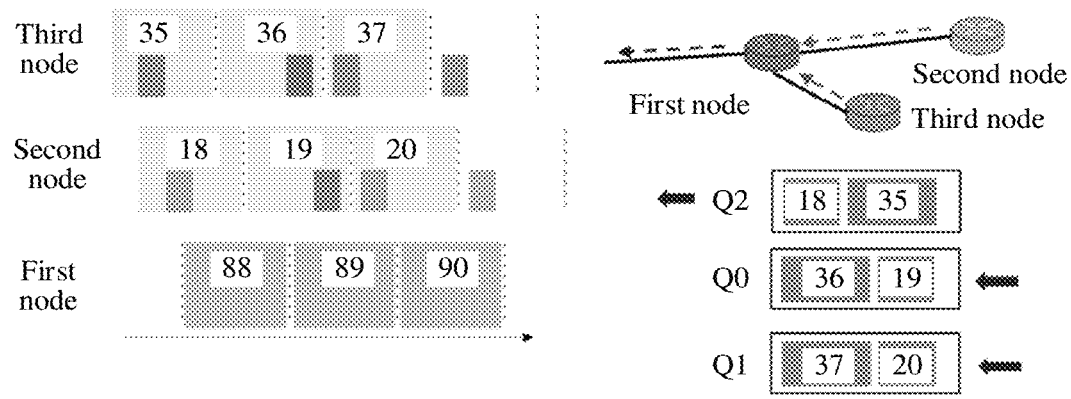
FIG. 3B
| Version | Traffic class | Flow label | |
|---|---|---|---|
| Payload length | | Next header | Hop limit |
| Source address | | | |
| Destination address | | | |
FIG. 4A

| Version | Header length | Type of service | Length of the entire data packet | |
|---|---|---|---|---|
| Identification of the data packet | | | Flags | Fragment offset |
| Time to live | | Upper-layer protocol number | Header checksum | |
| Source IPv4 address | | | | |
| Destination IPv4 address | | | | |
| Options | | | | Padding |

FIG. 4B

| Lower-layer packet header | Extension header length | Options |
|---|---|---|

FIG. 4C

| Lower-layer packet header | Extension header length | Type | Remaining hop count |
|---|---|---|---|
| Type-specific data | | | |

FIG. 4D

| Lower-layer packet header | Extension header length | Type | Remaining hop count |
|---|---|---|---|
| Last entry of a segment list | Flag | Group tag ||
| At least one segment address ||||
| Optional TLV ||||

| Preamble | Start of frame | Destination MAC address | Source MAC address | 802.1Q tag (optional) | Ethernet type | Payload | Redundancy check |
|---|---|---|---|---|---|---|---|

| Label | Priority | Stack bottom | Redundancy check |
|---|---|---|---|

PACKET PROCESSING METHOD AND APPARATUS

CROSS-REFERENCE TO RELATED APPLICATIONS

This application is a continuation of International Application No. PCT/CN2019/088700, filed on May 28, 2019, which claims priority to Chinese Patent Application No. 201810524838.9, filed on May 28, 2018. The disclosures of the aforementioned applications are hereby incorporated by reference in their entireties.

TECHNICAL FIELD

This application relates to the field of communications technologies, and in particular, to a data processing method and apparatus.

BACKGROUND

A deterministic network is a research hotspot in the field of current communications technologies. Requirements for the deterministic network mainly come from industrial internet, smart factory, remote deployment and cloudification of a programmable logic controller (PLC), real-time interaction of augmented reality (AR) or virtual reality (VR), remote surgery, tactile internet, and the like. A core of the deterministic network lies in ensuring end-to-end bandwidth, an end-to-end delay, and an end-to-end jitter of a service flow.

In the prior art, a node that does not understand information about a received packet may be unable to schedule the packet in time, and therefore cannot ensure a queuing delay of the packet on the node.

SUMMARY

Embodiments of the present invention provide a packet processing method and apparatus, to resolve a prior-art problem that a packet delay is difficult to ensure and learn.

According to a first aspect, a packet processing method is provided and is applied to a first node, where the method includes: obtaining N first packets, where N is an integer greater than or equal to 1, and each of the first packets includes a first label; and sending the N first packets in a sending period corresponding to the first label.

In this embodiment of the present invention, the first packets sent by the first node carry the first label, and the first packets are sent in the sending period corresponding to the first label. After receiving the first packets, a receiving node may learn of, according to the first label, the sending period in which the first node sends the first packets, and therefore, the receiving node is capable of controlling a queuing delay of the first packets.

In a possible design, the obtaining N first packets includes: obtaining M second packets, where M is an integer greater than or equal to 1 but less than or equal to N, and each of the second packets includes a second label; obtaining the first label according to the second label, and replacing the second label in the second packets with the first label to obtain M first packets.

In a possible design, the obtaining M second packets includes: obtaining the M second packets from a second node, and the second label is used to indicate a sending period in which the second node sends the second packets.

In a possible design, the obtaining the first label according to the second label includes: obtaining the first label according to the second label and an adjustment value corresponding to the second node.

In a possible design, the obtaining N first packets further includes: obtaining L third packets from a third node, where L is an integer greater than or equal to 1 but less than or equal to N, each of the third packets includes a third label, and the third label is used to indicate a sending period in which the third node sends the third packets; and obtaining the first label according to the third label and an adjustment value corresponding to the third node, and replacing the third label in the third packets with the first label to obtain L first packets.

In a possible design, the obtaining N first packets includes: determining a sending period of a fourth packet, and if the sending period of the fourth packet is the sending period corresponding to the first label, adding the first label to the fourth packet to obtain the first packets.

In a possible design, different first labels correspond to different sending periods.

In a possible design, the first packets are layer 2 data frames, and the first label is located in a frame header part of each of the layer 2 data frames.

In a possible design, the first packets are layer 3 data packets, and the first label is located in at least one of a basic header and an extension header of each of the layer 3 data packets.

In a possible design, the first label includes 2 bits, and a value of the 2 bits is one of 00, 01, 10, and 11.

In a possible design, one sending period is corresponding to one sending queue, and the first node includes three sending queues that are periodically used.

In a possible design, a sending period corresponding to the first label is a next sending period after all the second packets are received.

According to a second aspect, a packet processing apparatus is provided and includes: a processing module, configured to obtain N first packets, where N is an integer greater than or equal to 1, and each of the first packets includes a first label; and a sending module, configured to send the N first packets in a sending period corresponding to the first label.

In a possible design, the processing module is configured to: obtain M second packets, where M is an integer greater than or equal to 1 but less than or equal to N, and each of the second packets includes a second label; obtain the first label according to the second label; and replace the second label in the second packets with the first label to obtain M first packets.

In a possible design, the processing module is configured to obtain the M second packets from a second node, where the second label is used to indicate a sending period in which the second node sends the second packets.

In a possible design, the processing module is configured to obtain the first label according to the second label and an adjustment value corresponding to the second node.

In a possible design, the processing module is further configured to: obtain L third packets from a third node, where L is an integer greater than or equal to 1 but less than or equal to N, each of the third packets includes a third label, and the third label is used to indicate a sending period in which the third node sends the third packets; and obtain the first label according to the third label and an adjustment value corresponding to the third node, and replace the third label in the third packets with the first label to obtain L first packets.

In a possible design, the processing module is configured to: determine a sending period of a fourth packet, and if the sending period of the fourth packet is the sending period corresponding to the first label, add the first label to the fourth packet to obtain the first packets.

In a possible design, different first labels correspond to different sending periods.

In a possible design, the first packets are layer 2 data frames, and the first label is located in a frame header part of each of the layer 2 data frames.

In a possible design, the first packets are layer 3 data packets, and the first label is located in at least one of a basic header and an extension header of each of the layer 3 data packets.

In a possible design, the first label includes 2 bits, and a value of the 2 bits is one of 00, 01, 10, and 11.

In a possible design, one sending period is corresponding to one sending queue, and the first node includes three sending queues that are periodically used.

In a possible design, a sending period corresponding to the first label is a next sending period after all the second packets are received.

According to a third aspect, a packet processing apparatus is provided, where the apparatus includes a processing module and a memory, the memory is configured to store a program, and the processing module is used to invoke the program stored in the memory, to perform the method provided in the first aspect of the present invention.

According to a fourth aspect, a data processing apparatus is provided and includes at least one processing element (or chip) configured to perform the method according to the first aspect.

According to a fifth aspect, a computer storage medium is provided and includes a program, where the program is configured to perform the method according to the first aspect.

BRIEF DESCRIPTION OF THE DRAWINGS

FIG. 3A is a schematic diagram of packet transmission according to an embodiment of the present invention;

FIG. 3B is a schematic diagram of packet transmission according to an embodiment of the present invention;

FIG. 4A shows an IPv6 basic header according to an embodiment of the present invention;

FIG. 4B shows an IPv4 basic header according to an embodiment of the present invention;

FIG. 4C shows an IPv6 hop-by-hop packet header according to an embodiment of the present invention;

FIG. 4D shows an IPv6 routing extension header according to an embodiment of the present invention;

DETAILED DESCRIPTION OF ILLUSTRATIVE EMBODIMENTS

To make the objectives, technical solutions, and advantages of the present invention clearer and more comprehensible, the following further describes the present invention in detail with reference to the accompanying drawings and embodiments.

Figure 1A:
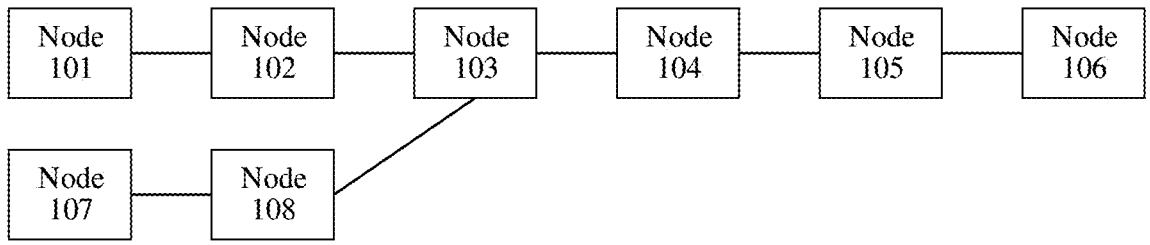
FIG. 1A is a schematic structural diagram of a network according to an embodiment of the present invention.

FIG. 1A is a schematic structural diagram of a network according to an embodiment of the present invention. The network includes a node 101, a node 102, a node 103, a node 104, a node 105, a node 106, a node 107, and a node 108. The node 101, the node 102, the node 103, the node 104, the node 105, and the node 106 are sequentially connected, the node 107 is connected to the node 108, and the node 108 is connected to the node 103. How to send a packet between the nodes and ensure a delay of the packet is a problem that urgently needs to be resolved. For example, if the node 101 sends a packet to the node 106 and the node 107 also sends a packet to the node 106, the node 103 to the node 105 process the packets sent by the two nodes. How to schedule the packets to ensure their delays becomes a problem in the industry, especially when there is a long link between nodes.

Figure 1B:
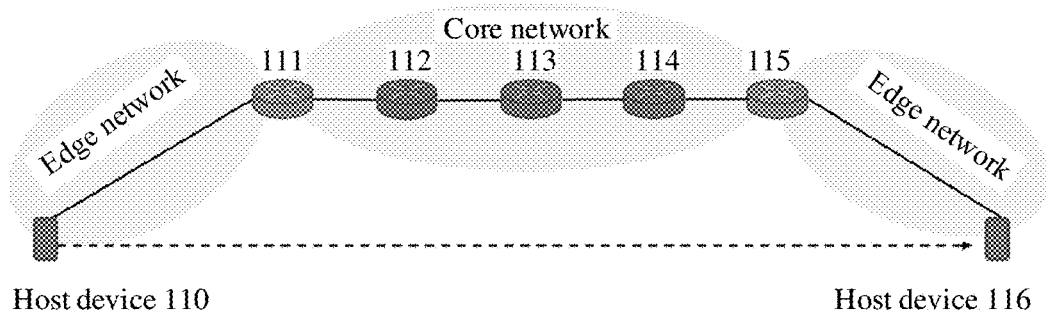
FIG. 1B is a schematic structural diagram of another network according to an embodiment of the present invention.

FIG. 1B is a schematic structural diagram of another network according to an embodiment of the present invention. The network includes a host device 110 and a host device 116. If the host device 110 needs to send a packet to the host device 116, the packet sent by the host device 110 passes through an edge network, a core network, and another edge network before arriving at the host device 116. Specifically, the packet passes through a node 111, a node 112, a node 113, a node 114, and a node 115 before arriving at the host device 116. The node 111 is used as an ingress edge node, the node 112, the node 113, and the node 114 serve as core nodes, and the node 115 serves as an egress edge node. If an end-to-end delay between the host device 110 and the host device 116 can be ensured and a jitter is relatively small, the internet can satisfy a service having a relatively high real-time requirement.

Figure 2:
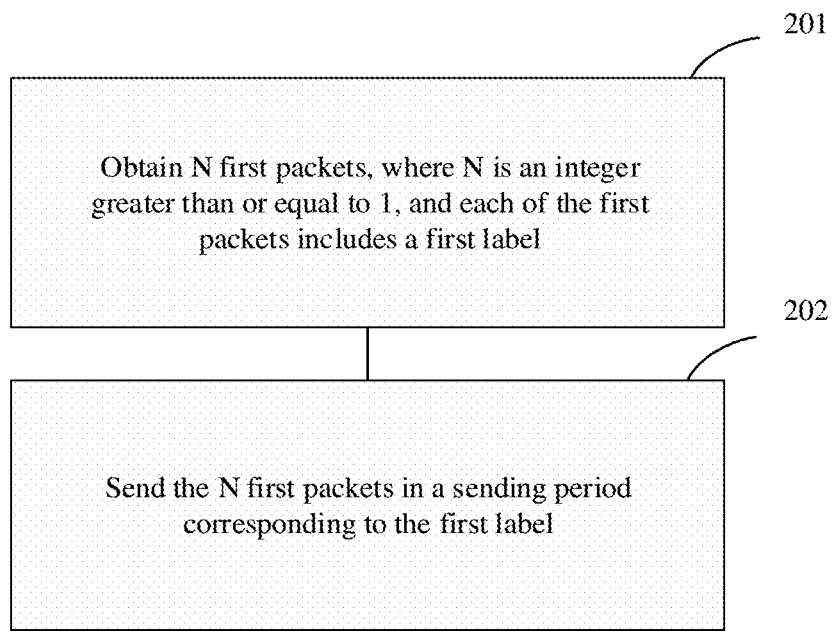
FIG. 2 is a flowchart of a packet processing method according to an embodiment of the present invention.

FIG. 2 is a flowchart of a packet processing method according to an embodiment of the present invention. The method may be applied to any node in FIG. 1A and FIG. 1B, which, for example, is referred to as a first node. The method specifically includes the following steps.

S201. Obtain N first packets, where N is an integer greater than or equal to 1, and each of the first packets includes a first label.

S202. Send the N first packets in a sending period corresponding to the first label.

In this embodiment of the present invention, the first packets sent by the first node carry the first label, and the first packets are sent in the sending period corresponding to the first label. After receiving the first packets, a receiving node may learn of, according to the first label, the sending period in which the first node sends the first packets, and therefore, the receiving node is capable of controlling a queuing delay of the first packets.

If the method shown in FIG. 2 is executed by an intermediate node, the first packets may be obtained according to a packet from an upstream node. In a possible design, step S201 may specifically include: obtaining M second packets, where M is an integer greater than or equal to 1 but less than or equal to N, and each of the second packets includes a second label; and obtaining the first label according to the second label, and replacing the second label in the second packets with the first label to obtain M first packets.

Specifically, the obtained M second packets may be from the second node, and the second node also uses a sending method similar to that in FIG. 2, that is, obtaining M second packets from the second node, where the second label is used to indicate a sending period in which the second node sends the second packets. In this case, the first label may be obtained according to the second label and an adjustment value corresponding to the second node.

The second node sends the second packets in the sending period corresponding to the second label. After receiving the second packets, the first node can learn of the sending period of the second node according to the second label carried in the second packets. After a delay of a link between the second node and the first node is also considered, the first node can learn of a time point at which the second node can receive all packets sent by the second node in the sending period corresponding to the second label, so that the first node is capable of controlling a queuing delay of the first packets. For example, the first node can forward, as soon as possible, all the packets sent by the second node in the sending period corresponding to the second label, and preferably, also send the packets in the same sending period of the first node, to further ensure delays of the packets. That is, the first node replaces the second label carried in the second packets with the first label, and sends the second packets in the sending period corresponding to the first label.

In addition, the first packets obtained in step S201 may also include a packet from a third node. In a possible design, step S201 may further includes: obtaining L third packets from the third node, where L is an integer greater than or equal to 1 but less than or equal to N, each of the third packets includes a third label, and the third label is used to indicate a sending period in which the third node sends the third packets; and obtaining the first label according to the third label and an adjustment value corresponding to the third node, and replacing the third label in the third packets with the first label to obtain L first packets. The first node may be the node 103 in FIG. 1A, the second node may be the node 102 in FIG. 1A, and the third node may be the node 108 in FIG. 1A.

In the foregoing embodiment, the second node sends the M second packets to the first node, where the second packets carry the second label, and the second label is used to indicate the sending period in which the second node sends the second packets; the third node sends the L third packets to the first node, where the third packets carry the third label, and the third label is used to indicate the sending period in which the third node sends the third packets. Both the label of the second packets and the label of the third packets on the first node are replaced with the first label, and then the second packets and the third packets are sent in the sending period corresponding to the first label. This case is described in the following embodiment by using an example.

FIG. 3A is a schematic diagram of packet transmission according to an embodiment of the present invention. A second node sends a packet to a first node, and both the second node and the first node perform the method shown in FIG. 2. It can be learned from FIG. 2 why the first node can learn of a time point at which all packets sent by the second node in a sending period corresponding to a second label are received. FIG. 3A is merely an example for description, and does not impose a limitation on the sending period or the like. The second node includes a sending period x and a sending period x+1, the first node includes a sending period y and a sending period y+1, and the second node and the first node may further include another sending period. After the second node sends a packet at an end of the sending period x, the packet is received by the first node after a link delay p between the second node and the first node. Because the link delay may jitter, the packet may be received by the first node after a link delay p+e. Because the packet is sent by the second node at the end of the sending period x, a time point at which the first node receives the packet falls within the sending period y. Therefore, when the sending period y ends, or before the sending period y+1 starts, all packets sent by the second node in the sending period x are received by the first node. These packets may be sent in the next sending period y+1 of the first node.

As shown in FIG. 3A, if a time difference between a time point at which the first node receives a last packet sent in the sending period x and a start time of the sending period y+1 is $\tau$, a single-hop queuing delay of the first node is T+$\tau$, where T is duration of one sending period, and an expected value of $\tau$ is 0.5 T. For a path with h hops, if a sending period of each node is T, a total delay is $\Sigma(T+\tau)$, an expected value is 1.5 hT (where h is a hop count), and a jitter is a constant 2 T.

A sending period before starting of which the first node can receive all the packets sent by the second node in the sending period x can be determined. For example, in the embodiment shown in FIG. 3A, before the sending period y+1 starts, the first node can receive all the packets sent by the second node in the sending period x. If all the packets sent by the second node in the sending period x can be sent in a same sending period of the first node, delays and jitters of the packets can be further ensured. If the packets can be sent in a next sending period after all the packets sent by the second node in the sending period x are received, a packet delay may be also further reduced. The packets sent by the second node may carry a second label, where the second label is used to indicate the sending period in which the second node sends the packets. For example, a value of the second label is 18, which is used to indicate that the sending period of the packets is 18. The first node may learn of the sending period of the packets on the second node by using the label of the received packets, to send, in the same sending period of the first node, all the packets sent by the second node in the sending period x.

A packet sent by the second node to the first node carries a label, and if the packet is sent in the sending period x, the value of the label is equal to x. The first node may maintain an adjustment value $\Delta X$ for the second node, and the first node may obtain, by using the label carried in the received packet and an adjustment value corresponding to the second node, a sending period in which the packet is forwarded and a corresponding label. For example, the first node receives, from the second node, a packet whose label is x, replaces the label with x+$\Delta X$, and sends the packet in the sending period x+$\Delta X$.

The first node maintains the adjustment value $\Delta X$ for the second node. The adjustment value may be calculated based on a length of an optical fiber between the second node and the first node, or may be obtained by sending a test packet. For example, the second node sends a test packet at the end of the sending period x, and the test packet carries the label x. If a time point at which the first node receives the test packet falls within the sending period y, $\Delta X$=y+1−x. Alternatively, the second node sends, at a beginning of the sending period x, a test packet that carries the label x, and a time point at which the first node receives the test packet falls within the sending period y. In this case, $\Delta X$=y+2−X.

Time synchronization is not required between the second node and the first node. For ease of use in a large network, clock synchronization is performed on nodes in the network, that is, clock frequencies of the nodes are all 1/T, where T is a sending period. In other words, the nodes in the entire network use a same sending period, but do not require time synchronization. Therefore, start time points of sending periods do not need to be aligned. In some embodiments, the second node does not need to send a packet in each period. Instead, the second node may send a packet at an interval of one sending period. In some embodiments, sending periods of the second node and the first node may be different.

The first label $x+\Delta X$, the second label x, and the adjustment value $\Delta X$ corresponding to the second node may be specific period values or values that can implicitly indicate a period. For example, the value of the second label is 18, and the adjustment value corresponding to the second node is 71. In this case, the value of the first label is 89. The value of the second label in the received second packets, that is, 18, is replaced with 89, the value of the first label. If the first node and the second node each include three queues that are cyclically used, a specific period value is divided by 3 to obtain a reminder. For example, the value of the second label is 0 (obtained by 18 mod 3), and the adjustment value corresponding to the second node is 2 (obtained by 71 mod 3). In this case, the value of the first label is 2 (obtained by 89 mod 3). Then, 0, the value of the second label in the received second packets, is replaced with 2, the value of the first label. Certainly, if a quantity of queues used by the first node and a quantity of queues used by the second node are another value, a specific period value may be divided by the another value to obtain a reminder. For example, the quantities of queues may be 4. In this case, the specific period value is divided by 4 to obtain a reminder. Using a value that implicitly indicates a period may reduce bandwidths occupied by the packets carrying the first label and those carrying the second label. Only 2 bits may be used to indicate the first label or the second label, and the value of the 2 bits may be one of 00, 01, 10, and 11.

As shown in FIG. 3A, the second node sends the packet at the end of the sending period x, the time point at which the first node receives the packet falls within the sending period y. In this case, the link delay may jitter. The solid line arrow from the second node to the first node represents a left boundary of the jitter, which indicates the earliest time at which the packet may arrive at the first node, and the dashed arrow from the second node to the first node represents a right boundary of the jitter, which indicates the latest time at which the packet may arrive at the first node. In FIG. 3A, both the left boundary and the right boundary of the jitter fall within the sending period y of the first node, which means that the first node receives, in the sending period y, some packets sent by the second node in the sending period x and some packets sent by the second node in the sending period x+1. Therefore, in the sending period y, the first node needs to maintain two receiving queues that are respectively corresponding to a packet sent by the second node in the sending period x and a packet sent by the second node in the sending period x+1. One receiving queue is corresponding to one sending period. For example, the receiving queue that is corresponding to the packet sent by the second node in the sending period x is corresponding to the sending period y+1. That is, in the sending period y+1, the receiving queue is converted into a sending queue for sending. In this case, the first node needs to maintain only the three queues that are cyclically used. Certainly, the receiving queue that is corresponding to the packet sent by the second node in the sending period x may be alternatively corresponding to a sending period y+2 or the like. That is, only in the sending period y+2, the receiving queue is converted into a sending queue for sending. In the sending period y+1, the receiving queue is still a queue waiting to be sent.

If the left boundary and the right boundary of the jitter fall within two adjacent sending periods, for example, the left boundary falls within the sending period y of the first node and the right boundary falls within the sending period y+1 of the first node, the first node may receive, in the sending period y+1, some packets sent by the second node in the sending period x, some packets sent by the second node in the sending period x+1, and some packets sent by the second node in a sending period x+2. Therefore, in the sending period y+1, the first node needs to maintain three receiving queues. If the left boundary and the right boundary of the jitter span a plurality of periods, a quantity of required receiving queues increases correspondingly. Details are not described herein.

FIG. 3B is a schematic diagram of another packet transmission according to an embodiment of the present invention. There are three nodes in the upper right corner of FIG. 3B. The nodes are a second node, a first node, and a third node, respectively. The second node and the third node each send a packet to the first node, and the first node forwards the received packets. Transmission directions of the packets are shown by dashed lines with arrows in the figure. As shown in the left part of FIG. 3B, the first node includes sending periods 88, 89, and 90. When the sending period 88 ends, all packets sent by the third node in a sending period 35 and all packets sent by the second node in a sending period 18 are received. In the sending period 89, some packets sent by the third node in a sending period 36 and some packets sent by the third node in a sending period 37 are received, and some packets sent by the second node in a sending period 19 and some packets sent by the second node in a sending period 20 are received. When the sending period 89 ends, all packets sent by the third node in the sending period 36 and all packets sent by the second node in the sending period 19 are received. As shown in the lower right part of FIG. 3B, there are three queues on the first node in the sending period 89: Q2, a sending queue, which includes all the packets sent by the third node in the sending period 35 and all the packets sent by the second node in the sending period 18; Q0, a receiving queue, which includes all packets sent by the third node in the sending period 36 and all packets sent by the second node in the sending period 19; and Q1, a receiving queue, which includes all packets sent by the third node in the sending period 37 and all packets sent by the second node in the sending period 20. During the sending period 90, the packets in Q2 have been sent. As a result, Q2 changes to a receiving queue, and is used to receive all packets sent by the third node in the sending period 38 and all packets sent by the second node in the sending period 21. Then, Q0 changes to a sending queue. It should be noted that "all packets" mentioned above refer to packets that can be received. A packet that is discarded or fails to be received may need to be retransmitted, and a retransmitted packet carries a new period label according to a new sending period.

If the method shown in FIG. 2 is executed by a source node, or the packet from the upstream node does not carry a period label, the first node may generate the first label; in a possible embodiment, determine a sending period of a fourth packet; and if the sending period of the fourth packet is the sending period corresponding to the first label, add the first label to the fourth packet to obtain the first packet. The first node receives or locally generates a packet, schedules and sends the packet, obtains a sending period of the packet, and adds the first label to the packet according to the obtained sending period. The packet may contain no field corresponding to the first label, and therefore, a corresponding field also needs to be added to the packet together with the first label. Alternatively, the packet may contain a field corresponding to the first label, but the corresponding field is invalid. In this case, adding the first label means that only the corresponding value needs to be replaced with the value of the first label.

A leaky bucket algorithm may be used for the first node to schedule the packet and obtain the sending period of the packet. The leaky bucket algorithm is an algorithm often used during traffic shaping or rate limiting in a network. A main objective of using the algorithm is to control a rate at which data is injected into the network, to smooth burst traffic in the network. The leaky bucket algorithm provides a mechanism through which burst traffic may be shaped to provide stable traffic for the network. A leaky bucket may be considered as a single-server queue with a constant service time. If the leaky bucket (packet cache) overflows, a data packet may be dropped.

In the network shown in FIG. 1B, if the ingress edge node in shapes a packet received from the host device no, determines a transmission period of the packet, and adds, to the packet, a period label corresponding to the transmission period, the core nodes 112 and 113 replace the label in the received packet, and send the packet in a newly determined sending period. In this case, a delay and a jitter of the packet between the ingress edge node in and the egress edge node 115 are ensured. An edge node performs traffic shaping. Total bandwidth occupied by traffic sent in a period may not exceed an allocated threshold. A core node performs scheduling according to a period label. When receiving traffic from a plurality of edge nodes, the core node can also forward packets in a corresponding period because the edge node has performed traffic shaping. Each packet has a determined scheduling period and scheduling of the packet occupies only a reserved resource of a current flow in the period. Therefore, a reserved resource of another flow is not occupied due to an offset to another period.

To implement an end-to-end delay of the entire network, a model is designed herein. The model is merely used as an example. It is assumed that a path of a data flow is determined, and each node on the path reserves bandwidth ri for the data flow on a corresponding interface. Then, a traffic model of the data flow is Ai(t)=rit+riT, where Ai(t) is total traffic bandwidth of the data stream i in the period t, rit is average bandwidth of the data stream i in the period t, and riT is burst traffic of the data stream i in the period t. The edge node performs traffic shaping, and an amount of data sent in each period does not exceed TΣri.

In the network shown in FIG. 1B, a packet passes through the ingress edge node in, the core node 112, the core node 113, the core node 114, and the egress edge node 115. A sending period of each node is T. A packet is shaped at the edge nodes periodically. The packet carries a period label, and label switching is performed at each of the core nodes. Each hop replaces the period label with a period label of the hop according to a label switching table. In addition, each hop of the packet on a path calculates, according to the label and the label switching table, a periodic scheduling queue that the packet is to enter and schedules the packet periodically. During queue scheduling, each node only needs three queues. At the beginning of each period, one of the queues is enabled for sending, and the other two queues are disabled for receiving. This is called periodic round-robin scheduling. The core nodes do not need to maintain a per-flow state, and therefore perform only aggregate-flow scheduling. Aggregate-flow scheduling is suitable for a large-scale network (with a large quantity of flows), and is supported in long-link and long-distance networks. There is a deterministic delay and jitter in an end-to-end manner. An end-to-end queuing delay is Σ(T+τ), an expected value is 1.5 Th, and an end-to-end delay jitter is less than or equal to 2 T (that is, ±T). The jitter is irrelevant to a quantity of hops. In addition, period start time points of nodes on the entire network do not need to be aligned, and therefore traffic shaping of an edge node and scheduling of a core node are very simple. Only three queues are required for periodic scheduling, and a buffer requirement of each queue is small.

A period label may have many locations in a packet. The following describes major and typical locations.

1. The Period Label is Located in a Basic Header of a Layer 3 Data Packet.

A. FIG. 4A shows an internet protocol version 6 (IPv6) basic header according to an embodiment of the present invention. The IPv6 basic header includes the following fields: version, traffic class, flow label, payload length, next header, hop limit, source address, and destination address. The period label may be carried in the traffic class field or the like.

B. FIG. 4B shows an internet protocol version 4 (IPv4) basic header according to an embodiment of the present invention. The IPv4 basic header includes the following fields: version, header length (IP Header Length, IHL), type of service, length of the entire data packet (Total Length), identification of the data packet, flags, fragment offset, time to live (TTL), upper-layer protocol number (Protocol), header checksum, source address, destination address, options, and padding. The period label may be carried by the type of service field. Differentiated services code point (DSCP) is a means of classifying quality of service (QoS). DSCP usually uses 6 bits of the type of service field. The type of service field further includes 2 unused bits, which may be used to carry the period label. The period label may alternatively be carried by DSCP.

2. The Period Label is Located in an Extension Header of a Layer 3 Data Packet.

C. FIG. 4C shows an IPv6 hop-by-hop packet header according to an embodiment of the present invention. The IPv6 hop-by-hop packet header includes the following fields: lower-layer packet header (Next Header), extension header length (Header Extension Length, Hdr Ext len), and options. The period label may be carried in the options field. For example, the period label may be carried in a TLV of the options field.

D. FIG. 4D shows an IPv6 routing extension header according to an embodiment of the present invention. The IPv6 routing extension header includes the following fields: lower-layer packet header, extension header length, type (Routing Type), remaining hop count (Segment left), and type-specific data. The period label may be carried in a reserve field in type-specific data. The type field is set to a new value defined by a standard.

Figures 4E, 4F, 4G, 5:
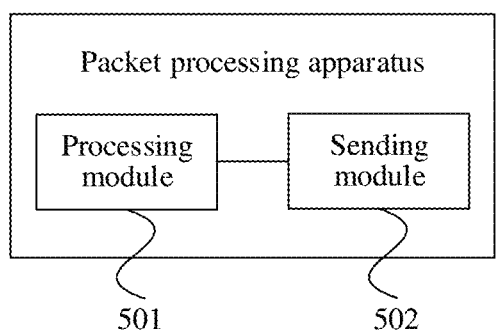
FIG. 4E shows an IPv6 segment routing extension header according to an embodiment of the present invention.
FIG. 4F shows a layer 2 Ethernet frame according to an embodiment of the present invention.
FIG. 4G shows an MPLS header field according to an embodiment of the present invention.
FIG. 5 is a schematic structural diagram of a packet processing apparatus according to an embodiment of the present invention.

E. FIG. 4E shows an IPv6 segment routing (SR) extension header. The IPv6 SR extension header includes the following fields: lower-layer packet header, extension header length, type (Routing Type), remaining hop count (Segment left), last entry of a segment list, flag (Flag), grouping tag (TAG), at least one segment address, and optional TLV (Optional Type Length Value objects). The period label may be carried in the optional TLV field and added to a suffix of a destination address in an IPv6 basic header to obtain and replace the period label, so that the optional TLV field can be parsed.

3. The Period Label is Located in a Layer 2 Data Packet.

FIG. 4F shows a layer 2 Ethernet frame according to an embodiment of the present invention. The layer 2 Ethernet frame includes the following periods: preamble, start of frame delimiter, destination MAC address, source MAC address, 802.1Q tag (optional), Ethernet type (Ether Type), payload, and redundancy check (CRC). The period label may be carried in the Ethernet type (Ether Type) field or the 802.1Q tag field.

4. The Period Label is Located in an MPLS Header Field.

G. FIG. 4G shows a multiprotocol label switching (MPLS) header according to by an embodiment of the present invention. The MPLS header includes the following fields: routing label (Label), priority (Exp), stack bottom (S), and life cycle. The period label may be carried in a priority field.

In addition, in an MPLS SR scenario, multiple layers of MPLS routing labels may exist. Each hop device on a path needs to obtain a second label from a popped upper-layer routing label, obtain a first label through calculation, and write the first label to a lower-layer routing label to complete switching of the period label. A storage location of the label may be shown in FIG. 4G, or may be carried in a priority field.

In this embodiment of the present invention, the second label in the second packets is replaced with the first label, where the replacement herein may also be referred to as swap, switching, rewriting, or the like. Values of fields that are in the second packets and carry the second label may be directly changed to the value of the first label. Optionally, the fields that are in the second packets and carry the second label are popped up, and then the field that includes the first label is inserted into the second packets to obtain the first packets. Optionally, the fields that are in the second packets and carry the second label may be popped up, and then values of another fields in the second packets are changed to the value of the first label, or the like. There may be many replacement manners. In addition, in addition to replacing the second label in the second packets with the first label, another fields of the second packets may be operated. For example, a hop count limit field is modified, or a time to live field is modified. This is not limited herein.

FIG. 5 shows a packet processing apparatus according to an embodiment of the present invention. The packet processing apparatus implements some or all functions of the first node by using software, hardware, or a combination thereof. The packet processing apparatus may be the first node or a chip applied to the first node. As shown in FIG. 5, the packet processing apparatus includes a processing module 501 and a sending module 502.

The processing module 501 is configured to obtain N first packets, where N is an integer greater than or equal to 1, and each of the first packets includes a first label.

The sending module 502 is configured to send the N first packets in a sending period corresponding to the first label.

In a possible design, the processing module is configured to: obtain M second packets, where M is an integer greater than or equal to 1 but less than or equal to N, and each of the second packets includes a second label; obtain the first label according to the second label; and replace the second label in the second packets with the first label to obtain M first packets.

In a possible design, the packet processing apparatus further includes a receiving module. A processor obtains the second packets by using the receiving module.

In a possible design, the processing module is configured to obtain the M second packets from a second node, where the second label is used to indicate a sending period in which the second node sends the second packets.

In a possible design, the processing module is configured to obtain the first label according to the second label and an adjustment value corresponding to the second node.

In a possible design, the processing module is further configured to: obtain L third packets from a third node, where L is an integer greater than or equal to 1 but less than or equal to N, each of the third packets includes a third label, and the third label is used to indicate a sending period in which the third node sends the third packets; and obtain the first label according to the third label and an adjustment value corresponding to the third node, and replace the third label in the third packets with the first label to obtain L first packets.

In a possible design, the processing module is configured to: determine a sending period of a fourth packet, and if the sending period of the fourth packet is the sending period corresponding to the first label, add the first label to the fourth packet to obtain the first packets.

In a possible design, different first labels correspond to different sending periods.

In a possible design, the first packets are layer 2 data frames, and the first label is located in a frame header part of each of the layer 2 data frames.

In a possible design, the first packets are layer 3 data packets, and the first label is located in at least one of a basic header and an extension header of each of the layer 3 data packets.

In a possible design, the first label includes 2 bits, and a value of the 2 bits is one of 00, 01, 10, and 11.

In a possible design, one sending period is corresponding to one sending queue, and the first node includes three sending queues that are periodically used.

In a possible design, a sending period corresponding to the first label is a next sending period after all the second packets are received.

The apparatus is configured to execute the foregoing method embodiment, implementation principles and technical effects thereof are similar, and details are not described herein. In addition, the sending module in the foregoing embodiment may be a transmitter, the receiving module may be a receiver, and the processing module may be a processor. Details are not described herein.

It should be noted that division of the modules in the foregoing apparatus is merely logical function division. In actual implementation, all or some of the modules may be integrated into one physical entity, or the modules may be physically separated. In addition, all of these modules may be implemented in a form of software invoked by using a processing element or may be implemented in a form of hardware, or some modules may be implemented in a form of software invoked by using a processing element and some modules may be implemented in a form of hardware. For example, a sending module may be an independently disposed element, or may be integrated into a chip of the foregoing device for implementation. In addition, the sending module may alternatively be stored in a memory of the foregoing device in a form of program code, and is invoked by a processing element of the foregoing device, to execute the foregoing functions of the determining module. Implementations of other modules are similar to the implementation of the sending module. In addition, all or some of the modules may be integrated together, or may be implemented separately. The processing element may be an integrated circuit and has a signal processing capability. In addition, it should be understood that the foregoing sending module may be a transmitter during actual implementation, the receiving module may be a receiver during actual implementation, and the processing module may be implemented in a form of software invoked by using the processing element or may be implemented in a form of hardware. In an implementation process, steps in the foregoing methods or the foregoing modules can be implemented by using a hardware integrated logical circuit in the processing element, or by using instructions in a form of software.

For example, the foregoing modules may be configured as one or more integrated circuits that implement the foregoing method, such as one or more application-specific integrated circuits (ASIC), one or more microprocessors (DSP), or one or more field programmable gate arrays (FPGA). For another example, when a foregoing module is implemented in a form of program code and invoked by a processing element, the processing element may be a general-purpose processor, for example, a central processing unit (CPU) or another processor that can invoke the program code. For another example, the modules may be integrated together, and implemented in a form of a system-on-a-chip (SOC).

It should be understood that the numbers such as "first", "second", "third", and "fourth" included in this specification are merely for distinguishing purposes for ease of description, and are not intended to limit the scope of the embodiments of the present invention.

Figure 6:
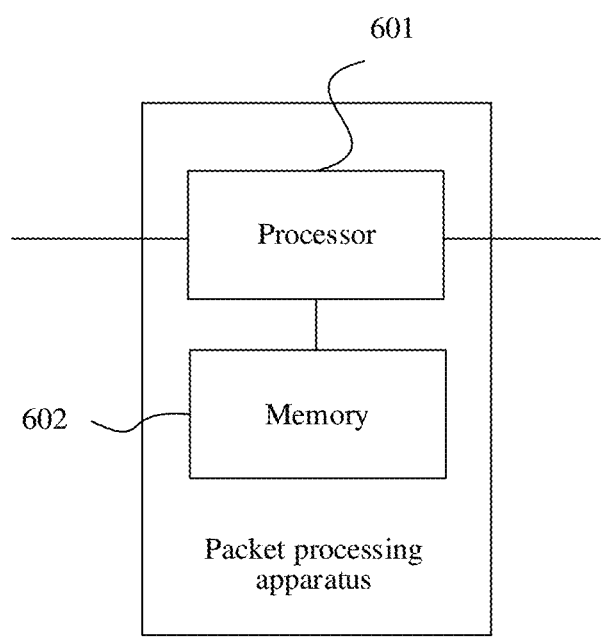
FIG. 6 is a schematic structural diagram of another packet processing apparatus according to an embodiment of the present invention.

FIG. 6 is a schematic structural diagram of a bit block processing apparatus according to an embodiment of the present invention. The apparatus may be the node 101, 102, 103, 104, 105, or 106 in FIG. 1. As shown in FIG. 6, the apparatus includes a memory 602 and a processor 601.

The memory 602 may be an independent physical unit, and may be connected to the processor 601 by using a bus. Alternatively, the memory 602 and the processor 601 may be integrated together and implemented by using hardware.

The memory 602 is configured to store a program for implementing the foregoing method embodiment or each module in the embodiment shown in FIG. 5. The processor 601 invokes the program to perform an operation of the foregoing method embodiment.

Optionally, when a part or all of the service data transmission method in the foregoing embodiment is implemented by using software, the foregoing apparatus may also include only the processor. The memory configured to store the program is located outside an access device, and the processor is connected to the memory by using a circuit or wire and is configured to read and execute the program stored in the memory.

The processor may be a central processing unit (CPU), a network processor (NP), or a combination of the CPU and the NP.

The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory may include a volatile memory, for example, a random access memory (RAM); or the memory may include a non-volatile memory, for example, a flash memory, a hard disk drive (HDD), or a solid-state drive (SSD); or the memory may include a combination of the foregoing types of memories.

An embodiment of this application further provides a computer storage medium storing a computer program, where the computer program is configured to perform the service data transmission method provided by the foregoing embodiment.

An embodiment of this application further provides a computer program product including an instruction, where when the computer program product is run on a computer, the computer is enabled to perform the service data transmission method provided by the foregoing embodiment.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A method, comprising:
   obtaining M second packets, wherein M is an integer greater than or equal to 1, and each second packet of the M second packets comprises a second label;
   obtaining a first label for each second packet according to the second label;

replacing the second label in each second packet of the M second packets with a first label, to obtain M first packets;

obtaining, by a first node, N first packets, the N first packets comprising the M first packets, M is less than or equal to N, wherein N is an integer greater than or equal to 1, and each first packet of the N first packets comprises the first label; and sending, by the first node, the N first packets in a sending period corresponding to the first label, the sending period for the M first packets determined based on the second label.

2. The method according to claim 1, wherein the determining the sending period based on the second label comprises determining the sending period based on the first label.

3. The method according to claim 1, wherein the sending period corresponding to the first label is a next sending period after a period in which all second packets of the M second packets are received.

4. The method according to claim 1, wherein obtaining the M second packets comprises:

obtaining the M second packets from a second node, wherein the second label in each second packet of the M second packets indicates a sending period in which the second node sends the M second packets.

5. The method according to claim 4, wherein obtaining the first label according to the second label comprises:

obtaining the first label according to the second label and an adjustment value corresponding to the second node.

6. The method according to claim 5, wherein obtaining the N first packets further comprises:

obtaining L third packets from a third node, wherein L is an integer greater than or equal to 1, L is less than or equal to N, each third packet of the L third packets comprises a third label, and the third label of each third packet indicates a sending period in which the third node sends the L third packets;

obtaining the first label for the L third packets according to the third label and an adjustment value corresponding to the third node; and replacing the third label in each third packet of the L third packets with the first label, to obtain L first packets.

7. The method according to claim 1, wherein obtaining the N first packets comprises:

determining a sending period of a fourth packet; and when the sending period of the fourth packet is the sending period corresponding to the first label, adding the first label to the fourth packet, to obtain a first packet of the N first packets.

8. The method according to claim 1, wherein different first labels correspond to different sending periods.

9. The method according to claim 1, wherein the first packets of the N first packets are layer 2 data frames, and the first label is located in a frame header of each of the layer 2 data frames.

10. The method according to claim 1, wherein the first packets of the N first packets are layer 3 data packets, and the first label is located in at least one of a basic header or an extension header of each of the layer 3 data packets.

11. The method according to claim 1, wherein the first label comprises 2 bits, and a value of the 2 bits is 00, 01, 10, or 11.

12. The method according to claim 1, wherein sending periods have a one to one correspondence with sending queues, and the first node periodically uses three sending queues to send packets.

13. An apparatus, comprising a processor and a transmitter, the apparatus configured to:

obtain M second packets, wherein M is an integer greater than or equal to 1, and each second packet of the M second packets comprises a second label;

obtain a first label for each second packet according to the second label;

replace the second label in each second packet of the M second packets with a first label, to obtain M first packets;

obtain N first packets, the N first packets comprising the M first packets, M is less than or equal to N, wherein N is an integer greater than or equal to 1, and each first packet of the N first packets comprises the first label; and send the N first packets in a sending period corresponding to the first label, the sending period for the M first packets determined based on the second label.

14. The apparatus according to claim 13, wherein the determining the sending period based on the second label comprises determining the sending period based on the first label.

15. The apparatus according to claim 13, wherein the apparatus is configured to obtain the M second packets from a second node, wherein the second label indicates a sending period in which the second node sends the M second packets.

16. The apparatus according to claim 15, wherein the apparatus is configured to obtain the first label according to the second label and an adjustment value corresponding to the second node.

17. The apparatus according to claim 16, wherein the apparatus is further configured to:

obtain L third packets from a third node, wherein L is an integer greater than or equal to 1, L is less than or equal to N, each third packet of the L third packets comprises a third label, and the third label of each third packet indicates a sending period in which the third node sends the L third packets;

obtain the first label for the L third packets according to the third label and an adjustment value corresponding to the third node; and replace the third label in each third packet of the L third packets with the first label, to obtain L first packets.

18. The apparatus according to claim 13, wherein the apparatus is configured to:

determine a sending period of a fourth packet; and when the sending period of the fourth packet is the sending period corresponding to the first label, add the first label to the fourth packet, to obtain a first packet of the N first packets.

19. The apparatus according to claim 13, wherein different first labels correspond to different sending periods.

20. The apparatus according to claim 13, wherein the first packets of the N first packets are layer 2 data frames, and the first label is located in a frame header part of each of the layer 2 data frames.

* * * * *